United States Patent
Tang

(10) Patent No.: US 11,636,874 B1
(45) Date of Patent: Apr. 25, 2023

(54) MAGNETIC RECORDING HEAD HAVING A MAGNETIC POLE AND A WRITE SHIELD

(71) Applicant: TDK CORPORATION, Tokyo (JP)

(72) Inventor: Zhenyao Tang, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/509,834

(22) Filed: Oct. 25, 2021

(51) Int. Cl.
*G11B 5/31* (2006.01)
*G11B 5/127* (2006.01)
*G11B 5/23* (2006.01)

(52) U.S. Cl.
CPC .......... *G11B 5/3146* (2013.01); *G11B 5/1278* (2013.01); *G11B 5/23* (2013.01); *G11B 5/313* (2013.01); *G11B 5/3116* (2013.01); *G11B 5/3133* (2013.01)

(58) Field of Classification Search
None
See application file for complete search history.

(56) References Cited

U.S. PATENT DOCUMENTS

| | | | |
|---|---|---|---|
| 6,011,664 A | 1/2000 | Kryder et al. | |
| 8,320,080 B1* | 11/2012 | Braganca | H01L 43/08 360/125.71 |
| 8,379,352 B1 | 2/2013 | Braganca et al. | |
| 8,582,240 B1* | 11/2013 | Chen | G11B 5/3146 360/125.3 |
| 10,714,127 B1* | 7/2020 | Chen | G11B 5/3116 |
| 10,714,132 B1* | 7/2020 | Chen | G11B 5/4826 |
| 10,748,562 B1* | 8/2020 | Chen | G01R 33/093 |
| 10,770,104 B1* | 9/2020 | Chen | G11B 5/315 |
| 11,043,234 B2* | 6/2021 | Wu | G11B 5/314 |
| 11,049,513 B1* | 6/2021 | Le | G11B 5/235 |
| 11,189,304 B2* | 11/2021 | Wu | G11B 5/11 |
| 11,289,117 B1* | 3/2022 | Sasaki | G11B 5/3967 |
| 11,508,401 B1* | 11/2022 | Asif Bashir | G11B 5/3116 |
| 2008/0268291 A1 | 10/2008 | Akiyama et al. | |
| 2009/0080105 A1 | 3/2009 | Takashita et al. | |
| 2009/0080106 A1 | 3/2009 | Shimizu et al. | |
| 2013/0057983 A1 | 3/2013 | Tanabe et al. | |
| 2013/0120875 A1 | 5/2013 | Suto et al. | |
| 2016/0180867 A1 | 6/2016 | Takagishi et al. | |
| 2017/0236537 A1* | 8/2017 | Murakami | G11B 5/315 360/125.3 |
| 2020/0294537 A1* | 9/2020 | Nagasawa | G11B 5/235 |
| 2021/0056987 A1 | 2/2021 | Wu | |
| 2021/0375308 A1 | 12/2021 | Nagasawa et al. | |

OTHER PUBLICATIONS

Masayuki Takagishi et al., "Design Concept of MAS Effect Dominant MAMR Head and Numerical Study," IEEE Transactions on Magnetics, vol. 57, No. 3, Mar. 2021, 6 pages.
Jian-Gang Zhu et al., "Microwave Assisted Magnetic Recording," IEEE Transactions on Magnetics, vol. 44, No. 1, Jan. 2008, pp. 125-131.
Jan. 30, 2023 Office Action issued in U.S. Appl. No. 17/894,449.

* cited by examiner

*Primary Examiner* — Jefferson A Evans
(74) *Attorney, Agent, or Firm* — Oliff PLC

(57) ABSTRACT

This magnetic recording head includes a main magnetic pole, a write shield, and an oscillation element. The oscillation element has a first oscillation portion, a second oscillation portion, and a non-magnetic conductive layer provided therebetween. The oscillation element has a first current path connecting the main magnetic pole and the non-magnetic conductive layer to each other, and a second current path connecting the write shield and the non-magnetic conductive layer to each other.

17 Claims, 8 Drawing Sheets

MAGNETIC RECORDING HEAD HAVING A MAGNETIC POLE AND A WRITE SHIELD

BACKGROUND OF THE INVENTION

The present invention relates to a magnetic recording head and a magnetic disk drive.

Magnetic disk drives are required to have a high recording density. Regarding one of methods for realizing a high recording density, there is microwave-assisted magnetic recording (MAMR) for assisting with magnetic recording with microwaves. For example, US2021/0056987 describes a microwave-assisted-type magnetic recording head.

SUMMARY OF THE INVENTION

This magnetic recording head has a main magnetic pole, a write shield, and an oscillation element. The main magnetic pole leads to an air bearing surface and generates a recording magnetic field. The write shield faces the main magnetic pole on a lateral side of the main magnetic pole with respect to the air bearing surface. The oscillation element is provided in a gap between the main magnetic pole and the write shield. The oscillation element has a first oscillation portion, a second oscillation portion, and a non-magnetic conductive layer provided therebetween. The first oscillation portion is provided between the main magnetic pole and the non-magnetic conductive layer. The first oscillation portion includes a first ferromagnetic layer and a first non-magnetic layer. The first non-magnetic layer is provided between the first ferromagnetic layer and the main magnetic pole. The second oscillation portion is provided between the write shield and the non-magnetic conductive layer. The second oscillation portion includes a second ferromagnetic layer and a second non-magnetic layer. The second non-magnetic layer is provided between the second ferromagnetic layer and the write shield. The oscillation element has a first current path connecting the main magnetic pole and the non-magnetic conductive layer to each other, and a second current path connecting the write shield and the non-magnetic conductive layer to each other. This magnetic recording head can stably oscillate microwaves.

DETAILED DESCRIPTION OF THE INVENTION

Figure 1:
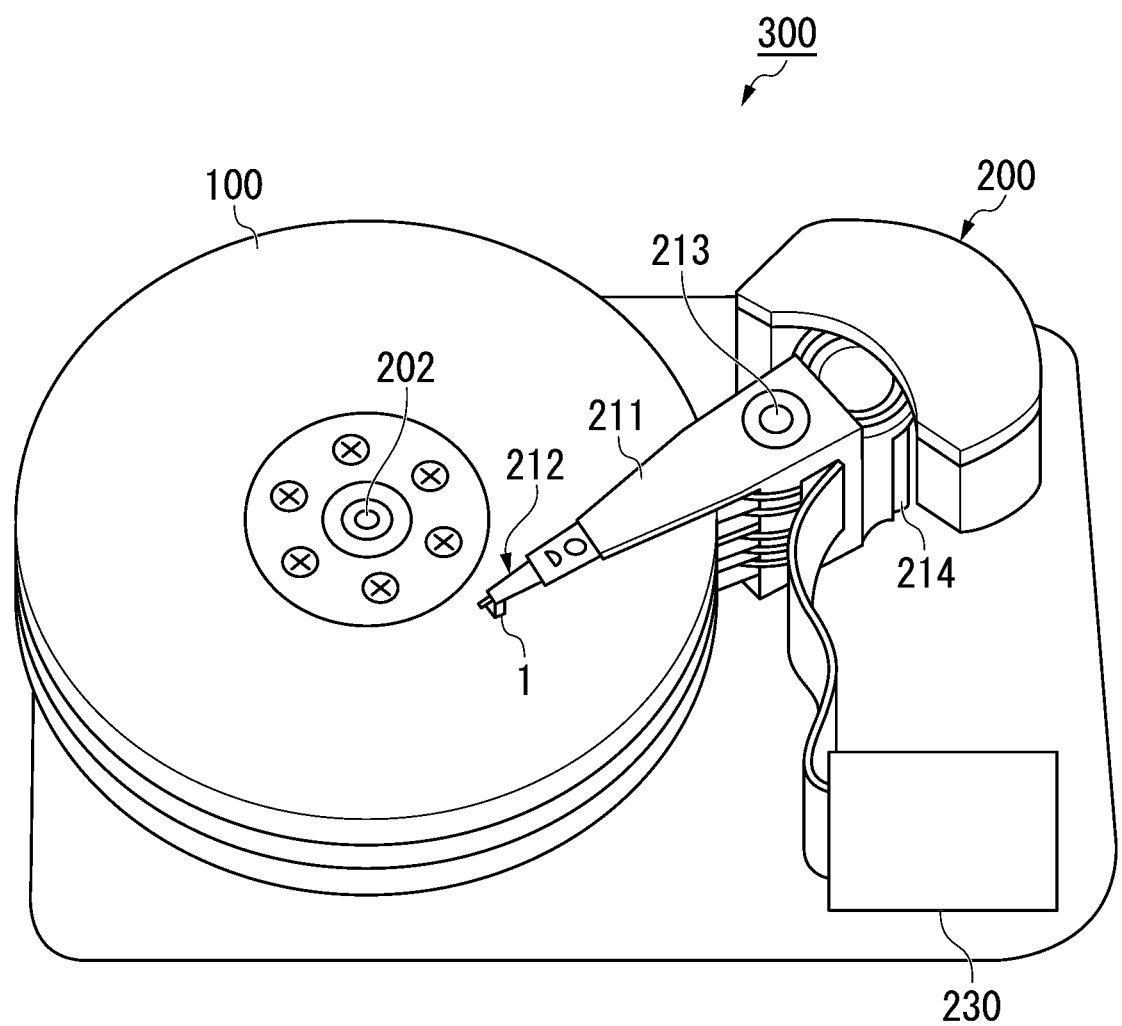
FIG. 1 is a schematic view of a magnetic disk drive according to a first embodiment.

Hereinafter, the present embodiment will be described in detail suitably with reference to the drawings. In the drawings used in the following description, in order to make characteristics easy to understand, characteristic parts may be illustrated in an enlarged manner for the sake of convenience, and dimensional ratios or the like of each constituent element may differ from actual values thereof. Materials, dimensions, and the like illustrated in the following description are merely exemplary examples. The present invention is not limited thereto and can be suitably changed and performed within a range in which the effects of the present invention are exhibited.

First Embodiment

FIG. 1 is a perspective view of a magnetic disk drive 300. The magnetic disk drive 300 includes magnetic recording media 100 and a carriage assembly device 200.

For example, the magnetic recording media 100 are magnetic disks. A plurality of magnetic recording media 100 are installed in the carriage assembly device 200. Data is recorded in the magnetic recording media 100. For example, the magnetic recording media 100 are perpendicular magnetic recording media. For example, each of the magnetic recording media 100 includes a soft magnetic underlayer, an intermediate layer, and a magnetic recording layer on a non-magnetic substrate. The magnetic recording media 100 can be installed in a spindle motor 202 of the carriage assembly device 200 and rotate about a shaft of the spindle motor 202.

The carriage assembly device 200 includes the spindle motor 202, drive arms 211, head gimbal assemblies (HGAs) 212, a bearing shaft 213, a voice coil motor (VCM) 214, and a control device 230. The carriage assembly device 200 controls the position of a magnetic recording head 1 with respect to the magnetic recording media 100.

The spindle motor 202 rotates the magnetic recording media 100. The drive arms 211 are stacked along the bearing shaft 213. The voice coil motor 214 allows each of the drive arms 211 to perform angle swinging about the bearing shaft 213. The head gimbal assemblies 212 are installed at tips of the drive arms 211. The magnetic recording head 1 (which will be described below) is installed in each of the head gimbal assemblies 212. The control device 230 controls writing and reading of the magnetic recording head 1.

FIG. 1 presents an example in which a plurality of magnetic recording media 100, drive arms 211, and HGAs 212 are provided, but there may be only one of each.

Figure 2:
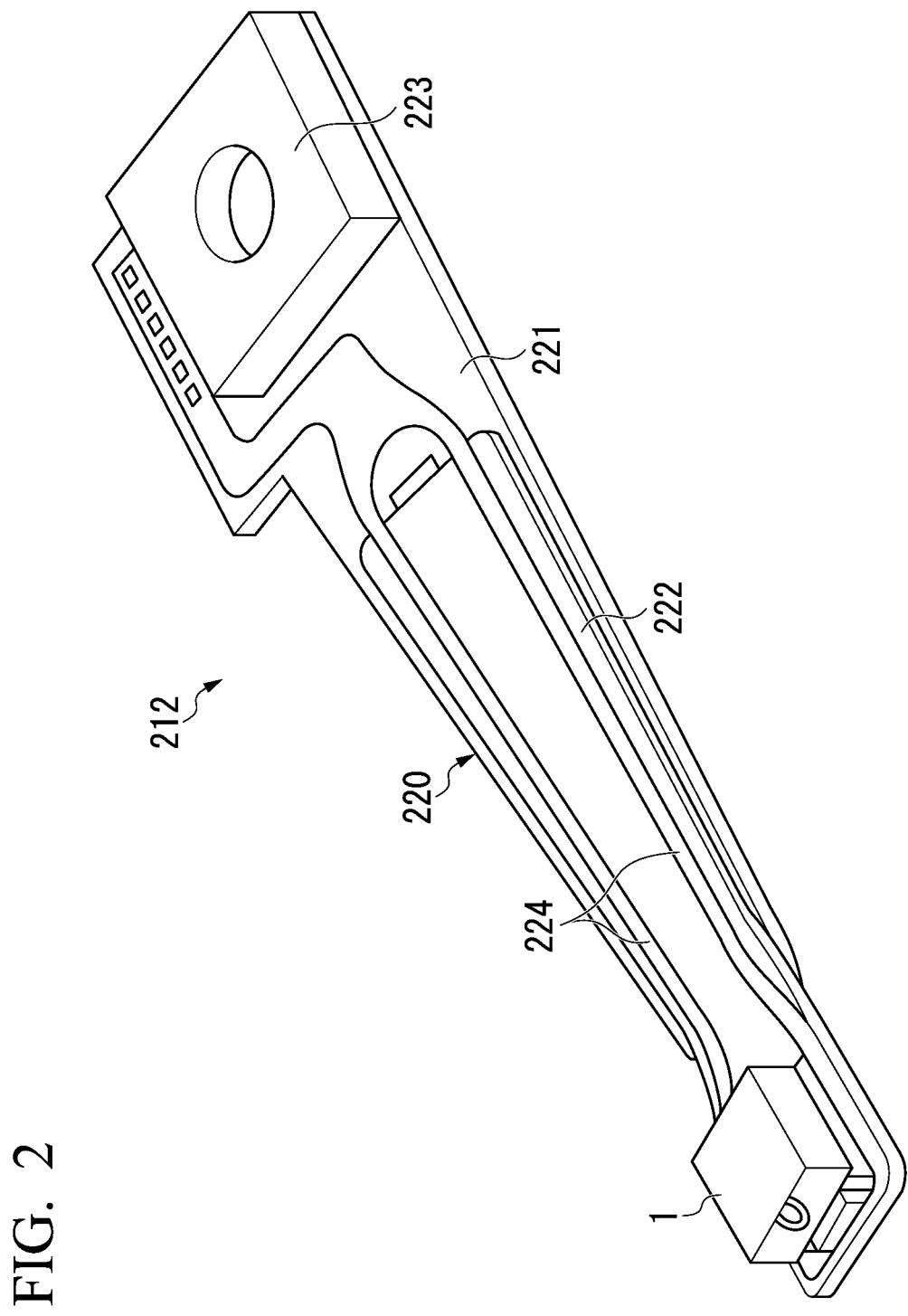
FIG. 2 is a schematic view of a head gimbal assembly of the magnetic disk drive according to the first embodiment.

FIG. 2 is a schematic view of the head gimbal assembly 212 of the magnetic disk drive according to a first embodiment. The head gimbal assembly 212 includes a suspension 220, wirings 224, and the magnetic recording head 1.

The suspension 220 includes a load beam 221, a flexure 222, and a base plate 223. The flexure 222 is fixedly attached to the load beam 221 and has elasticity. The base plate 223 is a support portion of the load beam 221.

The wirings 224 include a lead conductor on the flexure 222, and connection pads at both ends of the lead conductor. First ends of the wirings 224 are connected to a terminal electrode of the magnetic recording head 1, and second ends thereof are connected to the control device 230.

The magnetic recording head 1 faces a surface of each magnetic recording medium 100 with a certain space therebetween. The magnetic recording head 1 is fixedly attached to a tip of the flexure 222 of the suspension 220.

Figure 3:
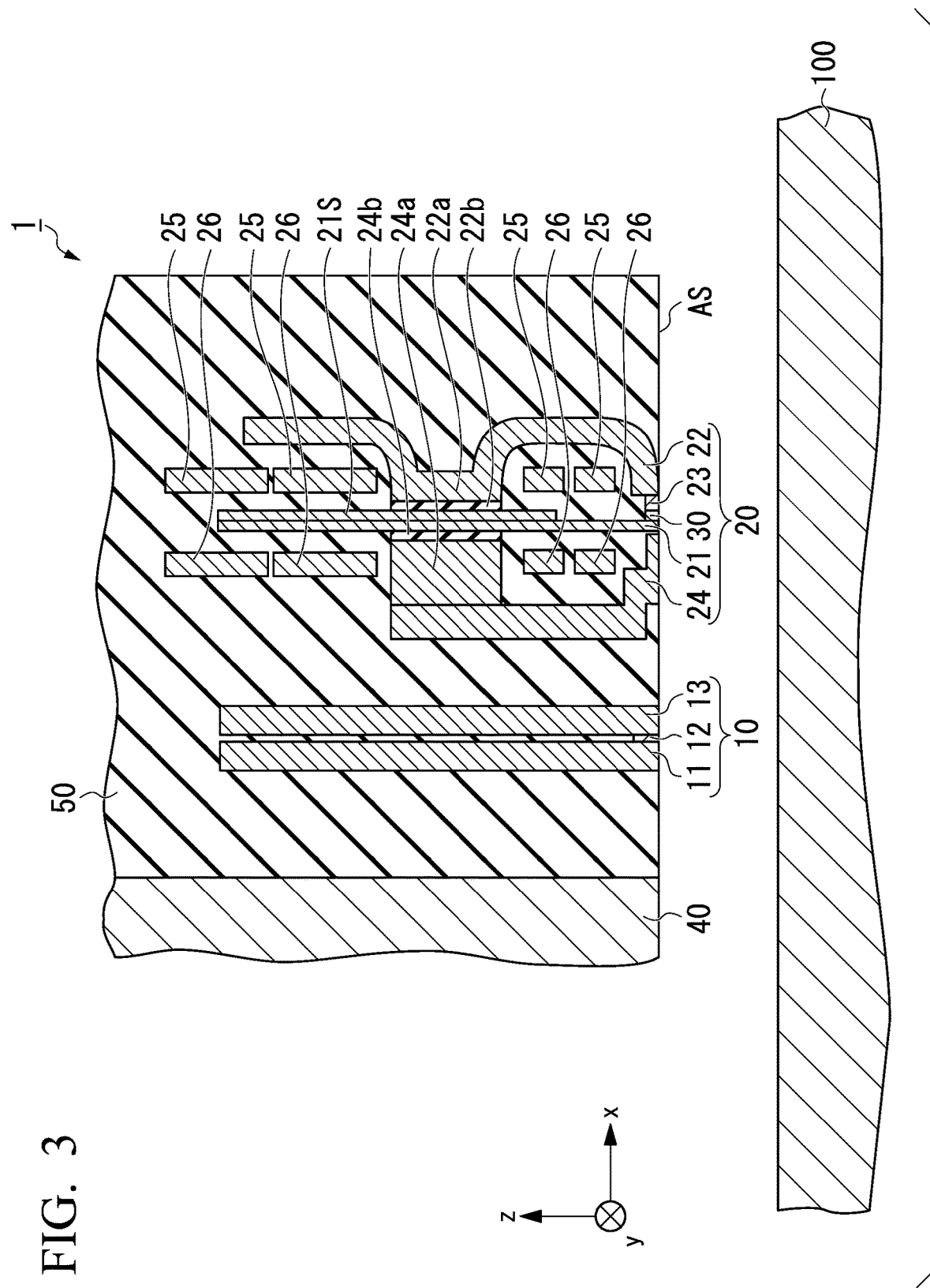
FIG. 3 is a cross-sectional view of a magnetic recording head according to the first embodiment.

FIG. 3 is a cross-sectional view of the magnetic recording head 1. The magnetic recording head 1 is disposed such that an air bearing surface AS faces the magnetic recording medium 100. The air bearing surface AS horizontally moves at a position floating from the magnetic recording medium 100 by a certain amount.

Here, directions will be defined. A plane on which the air bearing surface AS expands will be referred to as an xy plane. A direction in which the magnetic recording head 1 proceeds will be referred to as an x direction, and a direction orthogonal to the x direction will be referred to as a y direction. For example, the x direction coincides with a gap direction. In addition, a direction orthogonal to the air bearing surface AS will be referred to as a z direction. For example, the z direction coincides with a first direction.

For example, the magnetic recording head 1 has a reproduction head 10, a recording head 20, a slider substrate 40, and an insulation layer 50. The reproduction head 10 and the recording head 20 are stacked on the slider substrate 40 with the insulation layer 50 therebetween.

A known substrate can be used as the slider substrate 40. For example, the slider substrate is made of ceramic such as AlTiC. The insulation layer 50 is an interlayer insulating film. For example, the insulation layer 50 is made of silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide (ZrOx), or the like.

The reproduction head 10 receives a recording signal from the magnetic recording medium 100. For example, the reproduction head 10 includes a lower shield 11, a magneto-resistive effect element 12, and an upper shield 13.

The magneto-resistive effect element 12 detects a signal magnetic field from the magnetic recording medium 100. The magneto-resistive effect element 12 has two ferromagnetic layers and a non-magnetic layer sandwiched therebetween. For example, the magneto-resistive effect element 12 is a current-in—plane giant magneto-resistive (CIP-GMR) element, a current-perpendicular-plane giant magneto-resistive (CPP-GMR) element, or a tunneling magneto-resistive (TMR) element.

The resistance of the magneto-resistive effect element 12 changes depending on a relative angle of magnetizations of the two ferromagnetic layers. The magneto-resistive effect element 12 converts a signal magnetic field from the magnetic recording medium 100 into an electrical signal.

The lower shield 11 and the upper shield 13 curb the influence of an external magnetic field applied to the magneto-resistive effect element 12. An external magnetic field causes noise of the magneto-resistive effect element 12.

The lower shield 11 and the upper shield 13 include a soft magnetic body. For example, the lower shield 11 and the upper shield 13 are multilayer films including NiFe (Permalloy), FeSiAl (Sendust), CoFeNi, CoFe, FeN, FeZrN, CoZrTaCr, or a magnetic body.

When the magneto-resistive effect element 12 is a ClP-GMR element or a CPP-GMR element, the lower shield 11 and the upper shield 13 may also serve as electrodes for electrifying the magneto-resistive effect element 12. When the magneto-resistive effect element 12 is a TMR element, a wiring layer which is connected to the magneto-resistive effect element 12 and insulated from the lower shield 11 and the upper shield 13 is separately provided.

The recording head 20 applies a magnetic field to the magnetic recording medium 100 and performs writing with respect to the magnetic recording medium 100. For example, the recording head 20 includes a main magnetic pole 21, a trailing shield 22, a reading shield 24, coils 25 and 26, and an oscillation element 30.

The main magnetic pole 21 extends in the z direction, and a first end thereof leads to the air bearing surface AS. The main magnetic pole 21 generates a recording magnetic field when a writing current is applied to the coils 25 and 26. A magnetic flux generated in the main magnetic pole 21 leads to the magnetic recording medium 100. The magnetic recording medium 100 is subjected to writing by a recording magnetic field from the main magnetic pole 21. The main magnetic pole 21 may include an auxiliary magnetic pole 21S. The auxiliary magnetic pole 21S comes into contact with the main magnetic pole 21 at a position separated from the air bearing surface AS in the z direction.

The main magnetic pole 21 and the auxiliary magnetic pole 21S include a soft magnetic body. For example, the main magnetic pole 21 and the auxiliary magnetic pole 21S include an iron-based alloy material having Fe as a main component. For example, the iron-based alloy material is FeNi, FeCo, FeCoNi, FeN, FeZrN, or the like.

The trailing shield 22 causes a reflux of a magnetic flux generated from the main magnetic pole 21. The trailing shield 22 is a magnetic path of a magnetic flux which has been subjected to a reflux from a soft magnetic backing layer of the magnetic recording medium 100.

For example, the trailing shield 22 includes a coupling portion 22a and a back gap 22b. The back gap 22b insulates the main magnetic pole 21 and the coupling portion 22a from each other. The coupling portion 22a returns a magnetic flux, which has been subjected to a reflux along the trailing shield 22, to the main magnetic pole 21.

For example, the trailing shield 22 includes a write shield 23. The trailing shield 22 and the write shield 23 may be integrated. The write shield 23 is a part facing the main magnetic pole 21 in the trailing shield 22. The write shield 23 is provided on a lateral side of the main magnetic pole 21 with respect to the air bearing surface AS.

The trailing shield 22 includes a soft magnetic body. For example, the trailing shield 22 is formed of a Permalloy or a material similar to that of the main magnetic pole 21.

A gap (write gap) is provided between the main magnetic pole 21 and the write shield 23. The oscillation element 30 is provided in the gap. Details of the oscillation element 30 will be described below.

The reading shield 24 takes in a magnetic flux expanding from the main magnetic pole 21. For example, the reading shield 24 includes a coupling portion 24a and a back gap 24b. The reading shield 24 includes a material similar to that of the trailing shield 22.

The coils 25 and 26 are respectively wound around the coupling portions 22a and 24a and the back gaps 22b and 24b serving as center axes. The coils 25 and 26 include a highly conductive material such as Cu. When a writing current is applied to the coils 25 and 26, a recording magnetic field is generated from the main magnetic pole 21.

Figure 4:
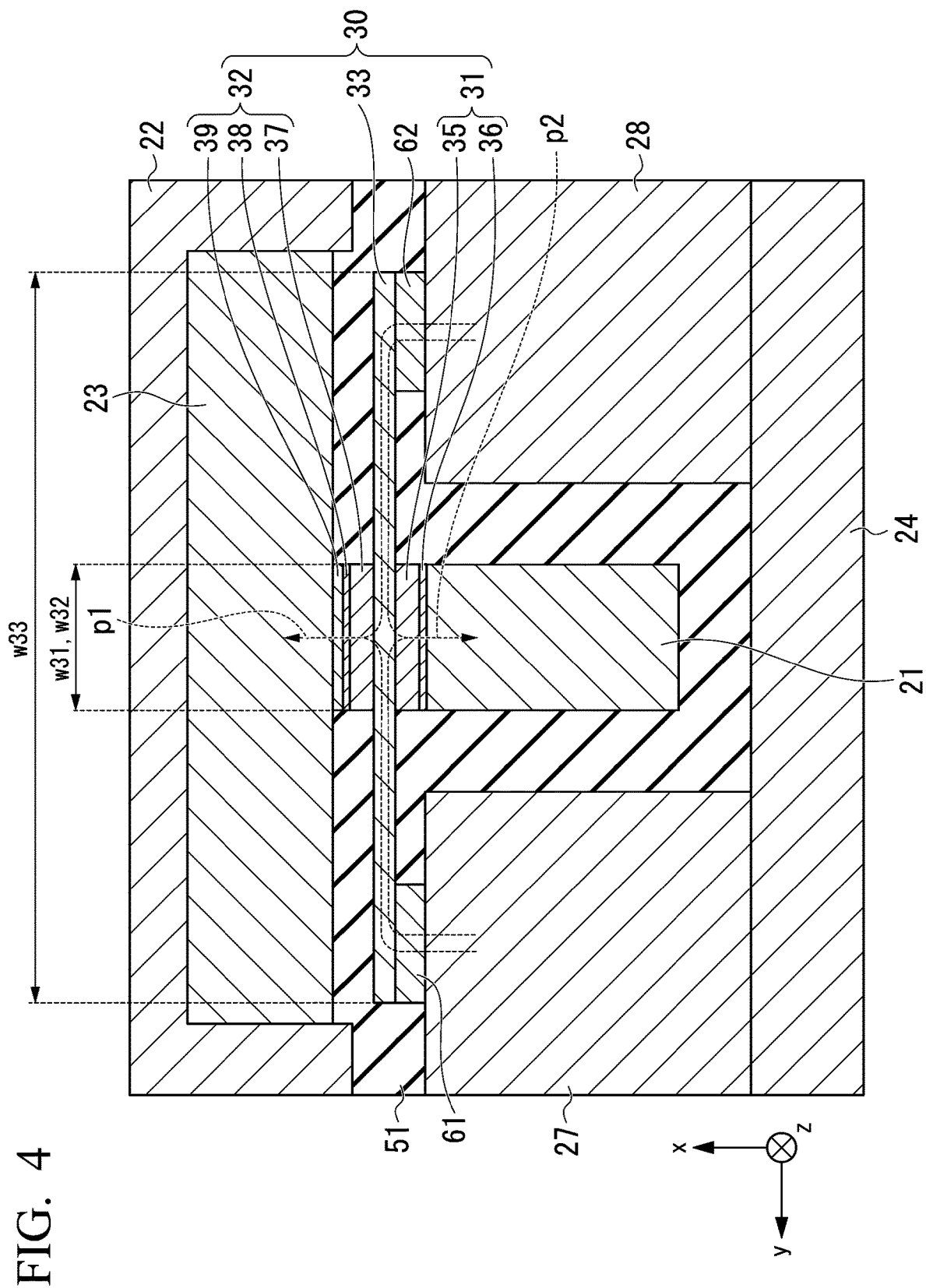
FIG. 4 is a plan view of a characteristic part of the magnetic recording head according to the first embodiment when viewed from an air bearing surface side.

FIG. 4 is a plan view of a part in the vicinity of the oscillation element 30 of the recording head 20 according to the first embodiment when viewed from the air bearing surface AS side. Side shields 27 and 28 are provided on lateral sides of the main magnetic pole 21. An insulation layer 51 is provided between each of the side shields 27 and 28 and the write shield 23, and the main magnetic pole 21. For example, the insulation layer 51 insulates the trailing shield 22 and the write shield 23 from the side shields 27 and 28. The insulation layer 51 is formed of a material similar to that of the insulation layer 50. Each of the side shields 27 and 28 is formed of a material similar to that of the trailing shield 22.

For example, a conductive layer 61 is provided between a non-magnetic conductive layer 33 of the oscillation element 30 and the side shield 27. The side shield 27 is electrically connected to the non-magnetic conductive layer 33 with the conductive layer 61 therebetween. For example, a conductive layer 62 is provided between the non-magnetic conductive layer 33 of the oscillation element 30 and the side shield 28. The side shield 28 is electrically connected to the non-magnetic conductive layer 33 with the conductive layer 62 therebetween. The conductive layers 61 and 62 include a highly conductive material such as Cu or Al.

Figure 5:
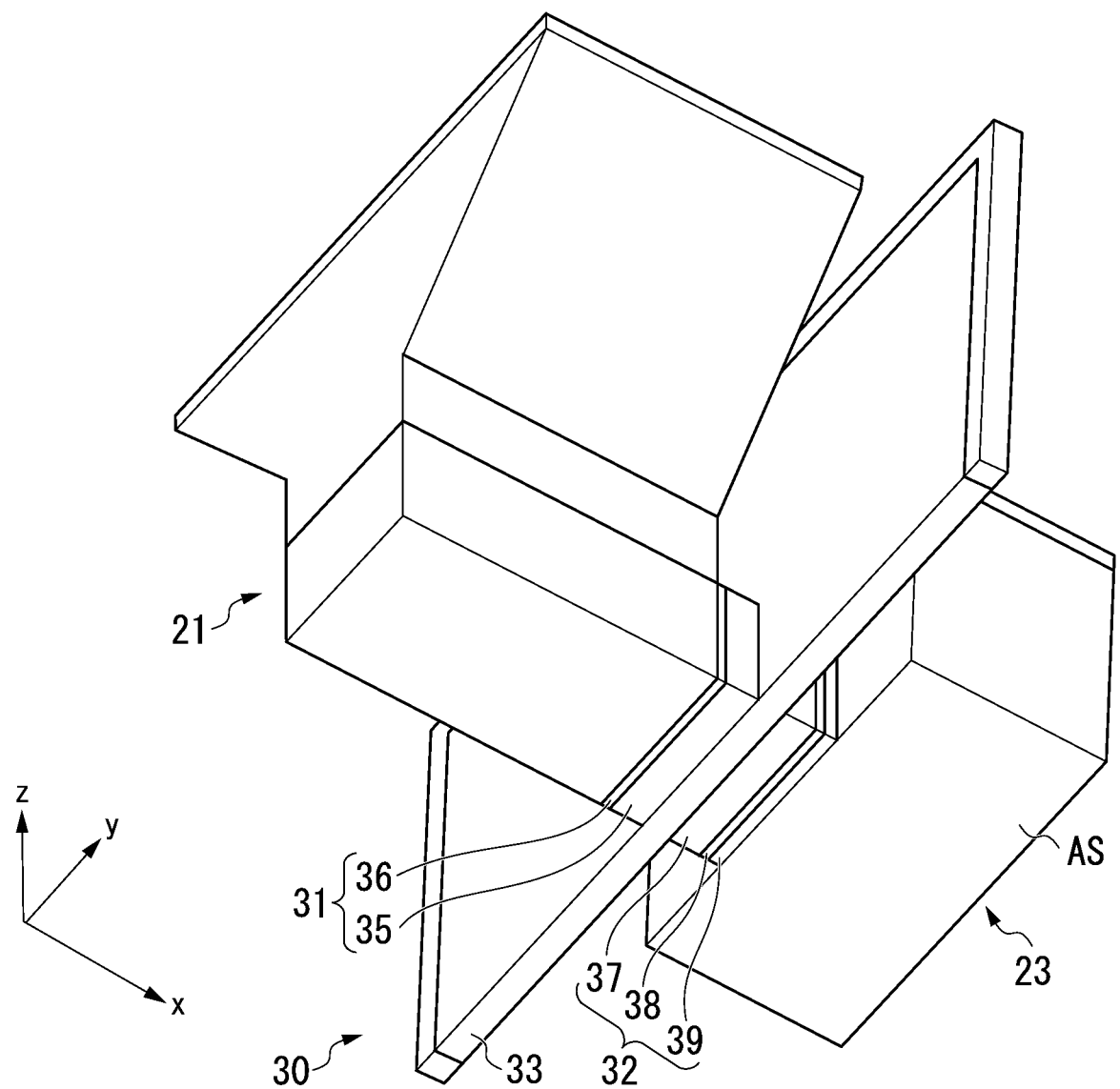
FIG. 5 is a perspective view of the characteristic part of the magnetic recording head according to the first embodiment when viewed from the air bearing surface side.
Figure 6:
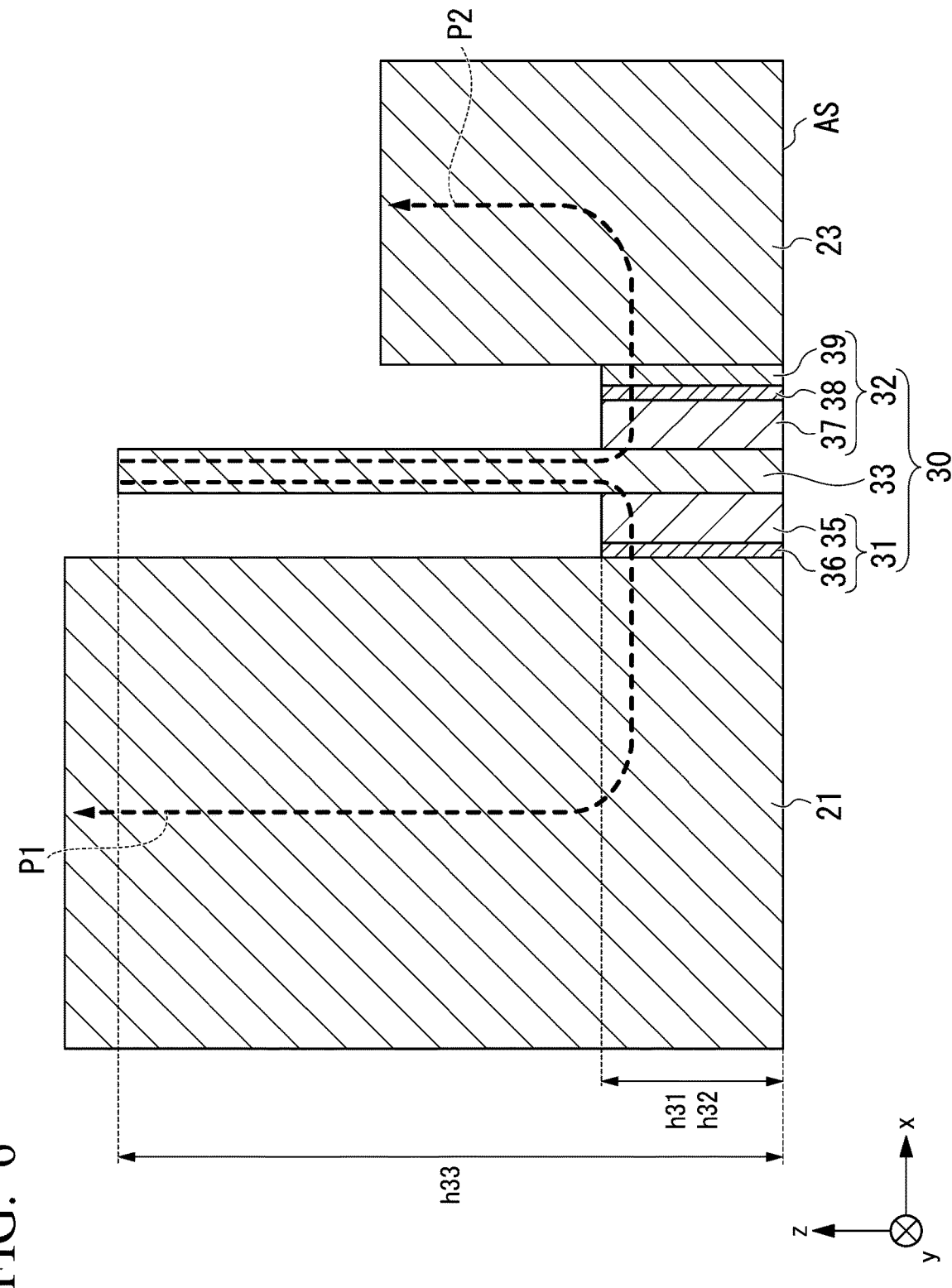
FIG. 6 is a cross-sectional view of the characteristic part of the magnetic recording head according to the first embodiment.

FIG. 5 is a perspective view of a part in the vicinity of the oscillation element 30 of the magnetic recording head 1 according to the first embodiment when viewed from the air bearing surface AS side. FIG. 6 is an xz cross section in the vicinity of the oscillation element 30 of the magnetic recording head 1 according to the first embodiment.

As described above, the oscillation element 30 is provided in the write gap between the main magnetic pole 21 and the write shield 23. The oscillation element 30 has a first oscillation portion 31, a second oscillation portion 32, and the non-magnetic conductive layer 33. The non-magnetic conductive layer 33 is provided between the first oscillation portion 31 and the second oscillation portion 32. The first oscillation portion 31 is provided between the main magnetic pole 21 and the non-magnetic conductive layer 33. The second oscillation portion 32 is provided between the trailing shield 22 and the non-magnetic conductive layer 33.

For example, an area of the non-magnetic conductive layer 33 is larger than an area of each of the first oscillation portion 31 and the second oscillation portion 32. The area is an area of a yz plane intersecting the gap direction. For example, a height h33 of the non-magnetic conductive layer 33 is larger than a height h31 of the first oscillation portion 31 and is larger than a height h32 of the second oscillation portion 32. The heights h31, h32, and h33 are heights in the z direction orthogonal to the air bearing surface AS. For example, a width w33 of the non-magnetic conductive layer 33 is larger than a width w31 of the first oscillation portion 31 and is larger than a width w32 of the second oscillation portion 32. The widths w31, w32, and w33 are widths in the y direction orthogonal to the gap direction. Since the size of the non-magnetic conductive layer 33 is larger than the sizes of the first oscillation portion 31 and the second oscillation portion 32, conduction with respect to the non-magnetic conductive layer 33 becomes easy.

Figure 7:
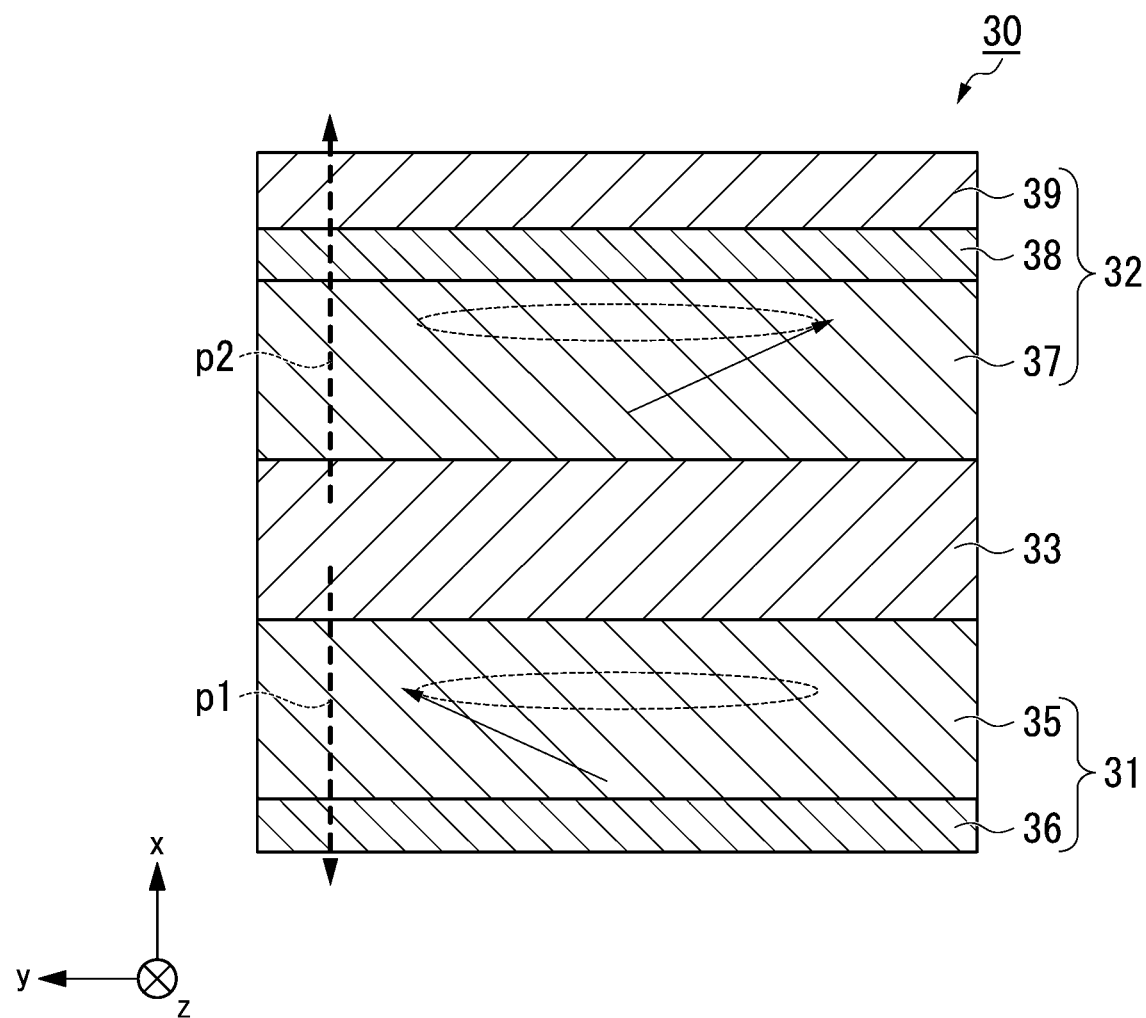
FIG. 7 is a cross-sectional view of an oscillation element according to the first embodiment.

FIG. 7 is a cross-sectional view of the oscillation element 30 according to the first embodiment. The first oscillation portion 31 has a first ferromagnetic layer 35 and a first non-magnetic layer 36. The first non-magnetic layer 36 is provided between the first ferromagnetic layer 35 and the main magnetic pole 21. The second oscillation portion 32 has a second ferromagnetic layer 37, a second non-magnetic layer 38, and a third ferromagnetic layer 39. The second non-magnetic layer 38 is provided between the second ferromagnetic layer 37 and the write shield 23. The third ferromagnetic layer 39 is provided between the second non-magnetic layer 38 and the write shield 23. The third ferromagnetic layer 39 may be integrated with the write shield 23.

Each of the first ferromagnetic layer 35, the second ferromagnetic layer 37, and the third ferromagnetic layer 39 includes a ferromagnetic body. For example, the ferromagnetic body is a metal selected from the group consisting of Cr, Mn, Co, Fe, and Ni; an alloy including one or more of these metals; an alloy including at least one or more elements of these metals, B, C, and N; or the like. For example, the ferromagnetic body is a Co—Fe, Co—Fe—B, Ni—Fe, or Co—Ho alloy, a Sm—Fe alloy, a Fe—Pt alloy, a Co—Pt alloy, or a CoCrPt alloy.

For example, in the first ferromagnetic layer 35, the product of the thickness and the magnetic flux density is 10 nmT or greater. For example, in the second ferromagnetic layer 37, the product of the thickness and the magnetic flux density is 10 nmT or greater. If the product of the thickness and the magnetic flux density of the ferromagnetic layer is sufficiently large, the magnetization of the ferromagnetic layer is not magnetically inverted, and precession thereof is easily performed.

For example, the thickness of the first ferromagnetic layer 35 is 90% to 110% of the thickness of the second ferromagnetic layer 37. If the thickness of the first ferromagnetic layer 35 and the thickness of the second ferromagnetic layer 37 are substantially uniform, timings of movement of the magnetization of the first ferromagnetic layer 35 and movement of the magnetization of the second ferromagnetic layer 37 are likely to coincide with each other, and thus the oscillation element 30 easily oscillates.

For example, the first non-magnetic layer 36 and the second non-magnetic layer 38 are non-magnetic conductive layers. For example, each of the first non-magnetic layer 36 and the second non-magnetic layer 38 is a metal of any one or an alloy containing any one selected from the group consisting of Cu, Au, Ag, Al, Ir, Ta, Ru, Pt, W, and Mo.

The non-magnetic conductive layer 33 is a flow channel for a drive current. The non-magnetic conductive layer 33 expands along the yz plane. The non-magnetic conductive layer 33 partially overlaps the first oscillation portion 31 when viewed in the x direction and expands to an outward side of the first oscillation portion 31. The non-magnetic conductive layer 33 partially overlaps the second oscillation portion 32 when viewed in the x direction and expands to an outward side of the second oscillation portion 32.

The non-magnetic conductive layer 33 is any one metal selected from or an alloy containing any one selected from the group consisting of Cu, Au, Ag, Al, Ir, Ta, Ru, Pt, W, and Mo.

For example, the thickness of the non-magnetic conductive layer 33 is 5 nm or larger. If the thickness of the non-magnetic conductive layer 33 is sufficiently large, a current easily flows along the non-magnetic conductive layer 33. The thickness of the non-magnetic conductive layer 33 is the thickness in the x direction.

Next, a writing operation with respect to the magnetic recording medium 100 using the magnetic recording head 1 will be described. The magnetic recording head 1 performs writing of data using the recording head 20. The recording head 20 performs microwave-assisted magnetic recording (MAMR) utilizing microwaves.

When data is written using the recording head 20, a writing current is applied to the coils 25 and 26, and a drive current is applied between the main magnetic pole 21 and the trailing shield 22 and the non-magnetic conductive layer 33.

First, application of a drive current will be described. A drive current flows in a first current path P1 connecting the main magnetic pole 21 and the non-magnetic conductive layer 33 to each other, and a second current path P2 connecting the write shield 23 and the non-magnetic conductive layer 33 to each other. In the first current path P1, for example, a drive current flows from the non-magnetic conductive layer 33 toward the main magnetic pole 21. In the second current path P2, for example, a drive current flows from the non-magnetic conductive layer 33 toward the write shield 23. For example, a drive current is supplied from the side shields 27 and 28 and the conductive layers 61 and 62 to the non-magnetic conductive layer 33. The main magnetic pole 21, the trailing shield 22, and the side shields 27 and 28 are connected to a drive power source.

The drive current which has flowed along the non-magnetic conductive layer 33 splits into the first oscillation portion 31 and the second oscillation portion 32. The drive current flowing along the first current path P1 applies a spin transfer torque to the magnetization of the first ferromagnetic layer 35. The drive current flowing along the second current path P2 applies a spin transfer torque to the magnetization of the second ferromagnetic layer 37.

The magnetizations of the first ferromagnetic layer 35 and the second ferromagnetic layer 37 exhibit precession upon reception of a spin transfer torque. The precession of the magnetization of the first ferromagnetic layer 35 and the precession of the magnetization of the second ferromagnetic layer 37 cause oscillation of microwaves. Since the first ferromagnetic layer 35 and the second ferromagnetic layer 37 have a symmetrical positional relationship on the basis of the non-magnetic conductive layer 33, each of them stably performs oscillation of microwaves.

In addition, if the first ferromagnetic layer 35 and the second ferromagnetic layer 37 have a symmetrical positional relationship on the basis of the non-magnetic conductive layer 33, the cycle of precession of the magnetization of the first ferromagnetic layer 35 and the cycle of precession of the second ferromagnetic layer 37 substantially coincide with each other. When the difference between the product of the thickness and the magnetic flux density of the first ferromagnetic layer 35 and the product of the thickness and the magnetic flux density of the second ferromagnetic layer 37 are within 10% of the average, the cycles of precession thereof are more likely to coincide with each other.

If the magnetization of the first ferromagnetic layer 35 and the magnetization of the second ferromagnetic layer 37 resonate, the oscillation element 30 performs oscillation of strong microwaves. Microwaves lead to the recording layer of the magnetic recording medium 100 and deteriorate stability of the magnetization of the recording layer.

In addition, if a writing current is applied to the coils 25 and 26, a magnetic flux is generated from the main magnetic pole 21. The magnetic flux generated from the main magnetic pole 21 leads to the recording layer of the magnetic recording medium 100 and causes inversion of the magnetization of the recording layer. If the magnetization of the recording layer of the magnetic recording medium 100 is inverted, data is written. Since stability of the magnetization of the recording layer has been deteriorated due to microwaves, the magnetization is likely to be inverted. That is, the magnetic recording head 1 has excellent writing efficiency.

As described above, in the magnetic recording head 1 according to the first embodiment, since the first ferromagnetic layer 35 and the second ferromagnetic layer 37 have a symmetrical positional relationship with respect to the non-magnetic conductive layer 33 to which a drive current is supplied, microwaves generated from the oscillation element 30 are made stable. The magnetic recording head 1 assists magnetization inversion of the magnetic recording medium 100 using microwaves. For this reason, if microwaves from the oscillation element 30 are made stable, data writing of the magnetic recording head 1 becomes stable.

Stable data writing of the magnetic recording head 1 enhances reliability of the magnetic disk drive 300.

Thus far, a preferable aspect of the present invention has been described as an example on the basis of the first embodiment, but the present invention is not limited to the embodiment. The embodiment can be subjected to change within a range satisfying the gist of the present invention.

For example, in the first embodiment, real-MAMR using microwaves generated through precession of the magnetizations of the first ferromagnetic layer 35 and the second ferromagnetic layer 37 has been described as an example. However, the present invention is not limited to this example, and FC-MAMR may be adopted. FC-MAMR assists magnetization inversion of the magnetic recording medium 100 using a magnetic flux generated from the first ferromagnetic layer 35 and the second ferromagnetic layer 37 instead of microwaves generated from the first ferromagnetic layer 35 and the second ferromagnetic layer 37.

In real-MAMR, the magnetizations of the first ferromagnetic layer 35 and the second ferromagnetic layer 37 are subjected to precession using a drive current. On the contrary, in FC-MAMR, the magnetizations of the first ferromagnetic layer 35 and the second ferromagnetic layer 37 are inverted using a drive current. If the magnetizations of the first ferromagnetic layer 35 and the second ferromagnetic layer 37 are inverted, a magnetic flux generated from each of the first ferromagnetic layer 35 and the second ferromagnetic layer 37 changes. The magnetic flux generated from each of the first ferromagnetic layer 35 and the second ferromagnetic layer 37 leads to the recording layer of the magnetic recording medium 100 and deteriorates stability of the magnetization of the recording layer.

Even in the case of FC-MAMR, since the first ferromagnetic layer 35 and the second ferromagnetic layer 37 have a symmetrical positional relationship with respect to the non-magnetic conductive layer 33 to which a drive current is supplied, microwaves generated from the oscillation element 30 are made stable.

Figure 8:
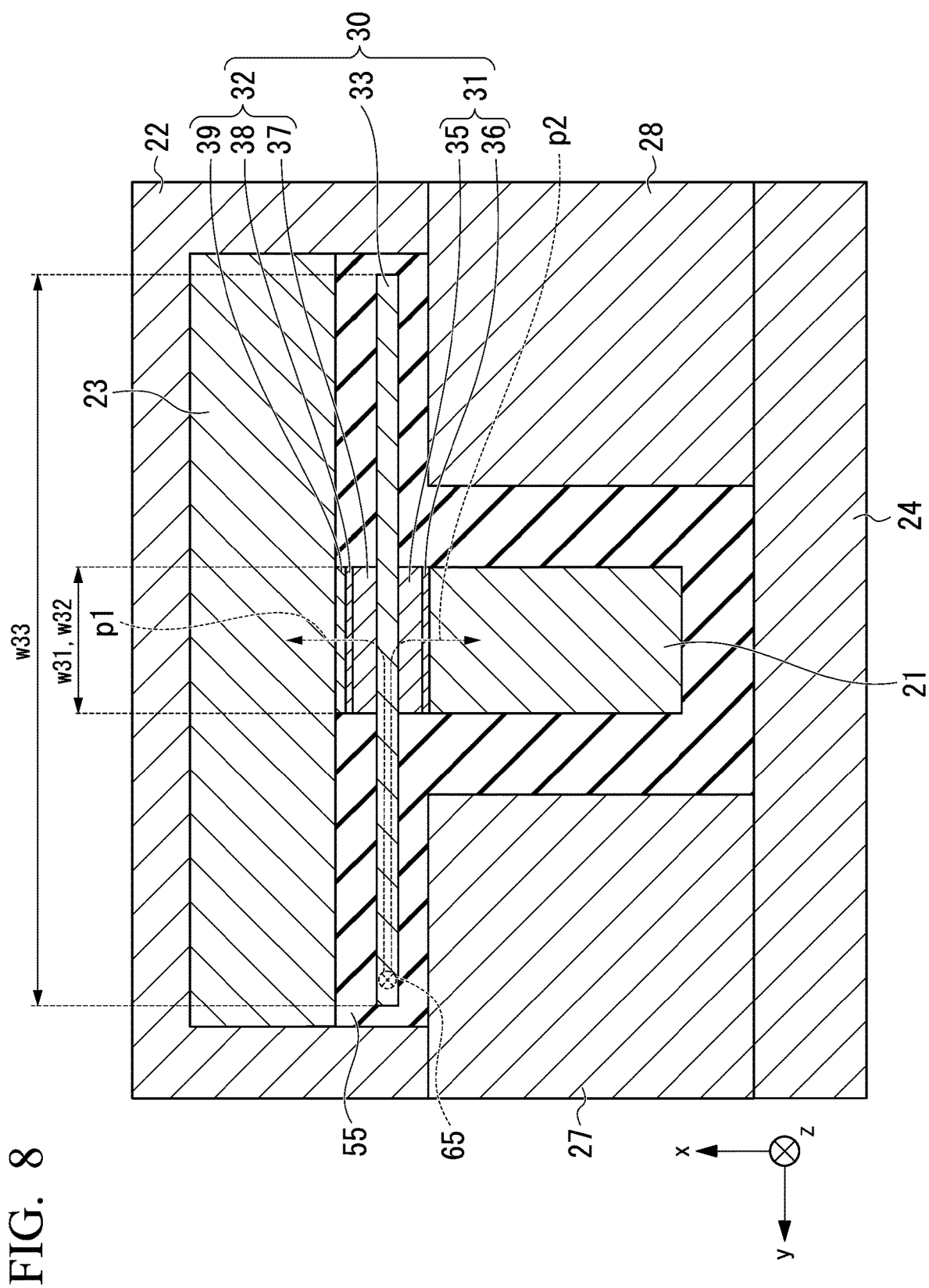
FIG. 8 is a plan view of a characteristic part of a magnetic recording head according to a first modification example when viewed from the air bearing surface side.

In addition, for example, FIG. 8 is a plan view of a characteristic part of a magnetic recording head according to a first modification example when viewed from the air bearing surface AS side. The magnetic recording head according to the first modification example differs from the magnetic recording head 1 according to the first embodiment in that the non-magnetic conductive layer 33 and the side shields 27 and 28 are not electrically connected to each other. In the first modification example, similar reference signs are applied to constitutions similar to those of the magnetic recording head 1 according to the first embodiment, and a description thereof will be omitted.

The trailing shield 22 is connected to the side shields 27 and 28. The trailing shield 22, the side shields 27 and 28, and the reading shield 24 surround the area around the main magnetic pole 21. An insulation layer 55 is provided in at least a portion between the trailing shield 22 and the side shields 27 and 28, and the reading shield 24 and the main magnetic pole 21.

For example, the non-magnetic conductive layer 33 is connected to a conductive layer 65 provided on a side in the direction of depth of this paper (z direction). For example, the conductive layer 65 includes a material similar to those of the conductive layers 61 and 62. The conductive layer 65 is connected to a drive power source. A drive current is supplied to the non-magnetic conductive layer 33 via the conductive layer 65. In FIG. 8, an example in which the conductive layer 65 is positioned in the z direction has been described, but the conductive layer 65 need only be electrically connected to the non-magnetic conductive layer 33.

It is also possible for the magnetic recording head according to the first modification example to achieve effects similar to those of the magnetic recording head 1 according to the first embodiment.

EXPLANATION OF REFERENCES

1 Magnetic recording head
10 Reproduction head
11 Lower shield
12 Magneto-resistive effect element
13 Upper shield
20 Recording head
21 Main magnetic pole
21S Auxiliary magnetic pole
22 Trailing shield
23 Write shield
24 Reading shield
22a, 24a Coupling portion
22b, 24b Back gap
25, 26 Coil
27, 28 Side shield
30 Oscillation element
31 First oscillation portion
32 Second oscillation portion
33 Non-magnetic conductive layer
35 First ferromagnetic layer
36 First non-magnetic layer
37 Second ferromagnetic layer
38 Second non-magnetic layer
39 Third ferromagnetic layer
40 Slider substrate
50, 51, 55 Insulation layer
61, 62, 65 Conductive layer
100 Magnetic recording medium
200 Carriage assembly device
202 Spindle motor
212 Head gimbal assembly
213 Bearing shaft
214 Voice coil motor
220 Suspension
221 Load beam
222 Flexure
223 Base plate
224 Wiring
230 Control device
300 Magnetic disk drive
P1 First current path
P2 Second current path

What is claimed is:

1. A magnetic recording head comprising:
a main magnetic pole that extends toward an air bearing surface and generates a recording magnetic field;
a write shield disposed on a lateral side of the main magnetic pole when viewed from the air bearing surface;
a side shield disposed on a lateral side of the main magnetic pole when viewed from the air bearing surface;
an insulation layer disposed between the side shield and the main magnetic pole, and between the side shield and the write shield; and
an element disposed in a gap between the main magnetic pole and the write shield, the element having:
a first portion including:
a first ferromagnetic layer; and
a first non-magnetic layer disposed between the first ferromagnetic layer and the main magnetic pole;
a second portion including:
a second ferromagnetic layer; and
a second non-magnetic layer disposed between the second ferromagnetic layer and the write shield;
a non-magnetic conductive layer disposed between the first portion and the second portion, the non-magnetic conductive layer being electrically connected to the side shield;
a first current path connecting the main magnetic pole and the non-magnetic conductive layer to each other; and
a second current path connecting the write shield and the non-magnetic conductive layer to each other,
wherein the first portion is disposed between the main magnetic pole and the non-magnetic conductive layer, and
the second portion is disposed between the write shield and the non-magnetic conductive layer.

2. The magnetic recording head according to claim 1, wherein the non-magnetic conductive layer is a metal of any one or an alloy containing any one selected from the group consisting of Cu, Au, Ag, Al, Ir, Ta, Ru, Pt, W, and Mo.

3. The magnetic recording head according to claim 1, wherein a height of the non-magnetic conductive layer in a first direction orthogonal to the air bearing surface is larger than that of the first portion and that of the second portion.

4. The magnetic recording head according to claim 1, wherein an area of the non-magnetic conductive layer is larger than that of the first portion and that of the second portion.

5. The magnetic recording head according to claim 1, wherein a thickness of the non-magnetic conductive layer is 5 nm or larger.

6. The magnetic recording head according to claim 1, wherein a width of the non-magnetic conductive layer in a direction orthogonal to a first direction perpendicular to the air bearing surface and a gap direction toward the write shield from the main magnetic pole when viewed from the air bearing surface to the first direction is larger than that of the first portion and that of the second portion.

7. The magnetic recording head according to claim 1, wherein in each of the first ferromagnetic layer and the second ferromagnetic layer, a product of a thickness and a magnetic flux density is 10 nmT or greater.

8. The magnetic recording head according to claim 1, wherein a thickness of the first ferromagnetic layer is 90% to 110% of a thickness of the second ferromagnetic layer.

9. A magnetic disk drive comprising:
the magnetic recording head according to claim 1; and
a magnetic recording medium that faces the air bearing surface.

10. A magnetic recording head comprising:
a main magnetic pole that extends toward an air bearing surface and generates a recording magnetic field;
a write shield disposed on a lateral side of the main magnetic pole when viewed from the air bearing surface; and
an element disposed in a gap between the main magnetic pole and the write shield, the element having:
a first portion including:
a first ferromagnetic layer; and
a first non-magnetic layer disposed between the first ferromagnetic layer and the main magnetic pole;
a second portion including:

a second ferromagnetic layer; and
a second non-magnetic layer disposed between the second ferromagnetic layer and the write shield;
a non-magnetic conductive layer disposed between the first portion and the second portion;
a first current path connecting the main magnetic pole and the non-magnetic conductive layer to each other; and
a second current path connecting the write shield and the non-magnetic conductive layer to each other,
wherein the first portion is disposed between the main magnetic pole and the non-magnetic conductive layer,
the second portion is disposed between the write shield and the non-magnetic conductive layer, and
a width of the non-magnetic conductive layer in a direction orthogonal to a first direction perpendicular to the air bearing surface and a gap direction toward the write shield from the main magnetic pole when viewed from the air bearing surface to the first direction is larger than that of the first portion and that of the second portion.

11. The magnetic recording head according to claim 10, wherein the non-magnetic conductive layer is a metal of any one or an alloy containing any one selected from the group consisting of Cu, Au, Ag, Al, Ir, Ta, Ru, Pt, W, and Mo.

12. The magnetic recording head according to claim 10, wherein a height of the non-magnetic conductive layer in the first direction is larger than that of the first portion and that of the second portion.

13. The magnetic recording head according to claim 10, wherein an area of the non-magnetic conductive layer is larger than that of the first portion and that of the second portion.

14. The magnetic recording head according to claim 10, wherein a thickness of the non-magnetic conductive layer is 5 nm or larger.

15. The magnetic recording head according to claim 10, wherein in each of the first ferromagnetic layer and the second ferromagnetic layer, a product of a thickness and a magnetic flux density is 10 nmT or greater.

16. The magnetic recording head according to claim 10, wherein a thickness of the first ferromagnetic layer is 90% to 110% of a thickness of the second ferromagnetic layer.

17. A magnetic disk drive comprising:
the magnetic recording head according to claim 10; and
a magnetic recording medium that faces the air bearing surface.

* * * * *